Oct. 6, 1936.   C. E. BERGER ET AL   2,056,501
LOADING MACHINE
Filed Oct. 26, 1934   3 Sheets-Sheet 1
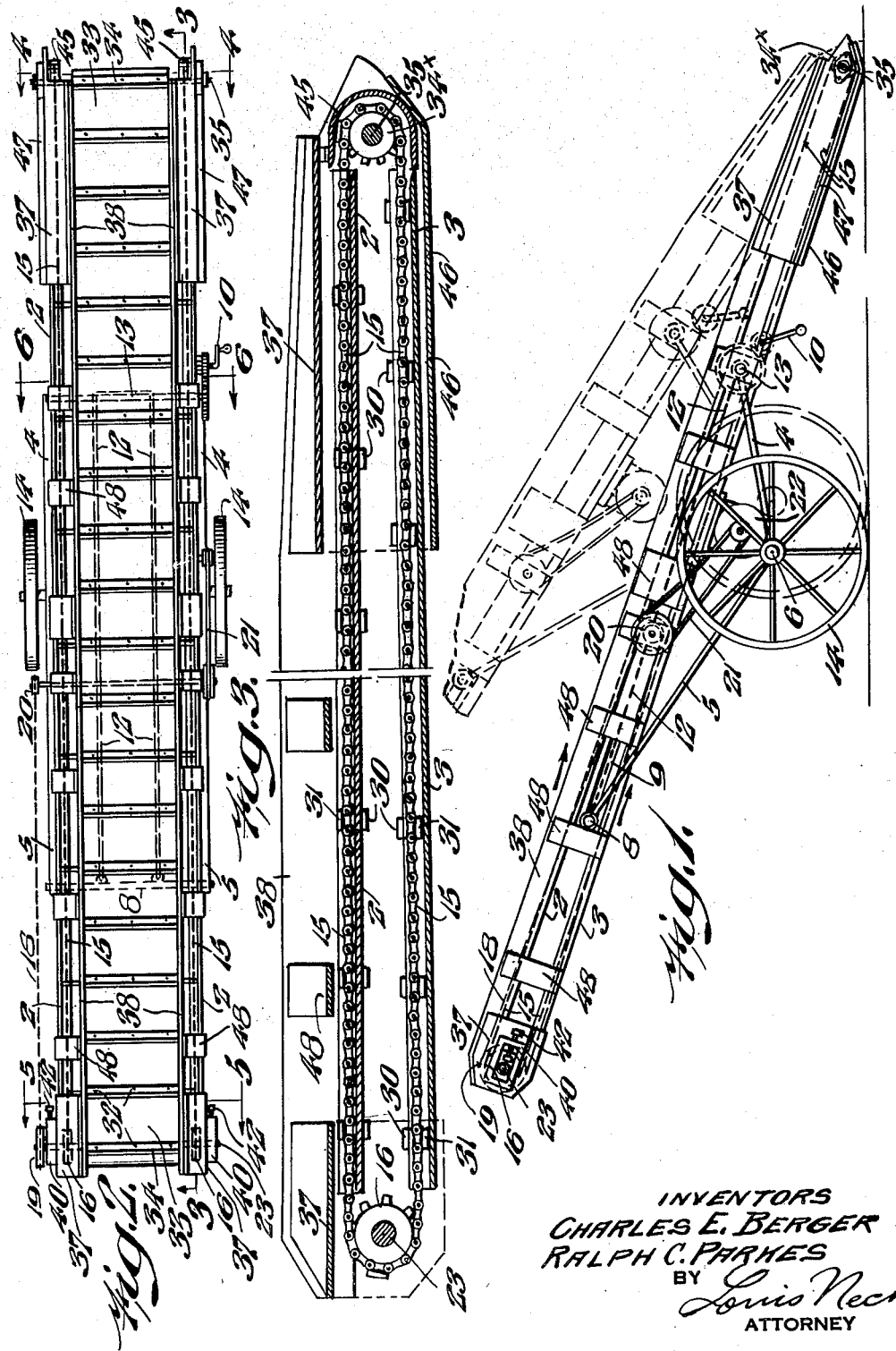
INVENTORS
CHARLES E. BERGER
RALPH C. PARKES
BY Louis Necho
ATTORNEY

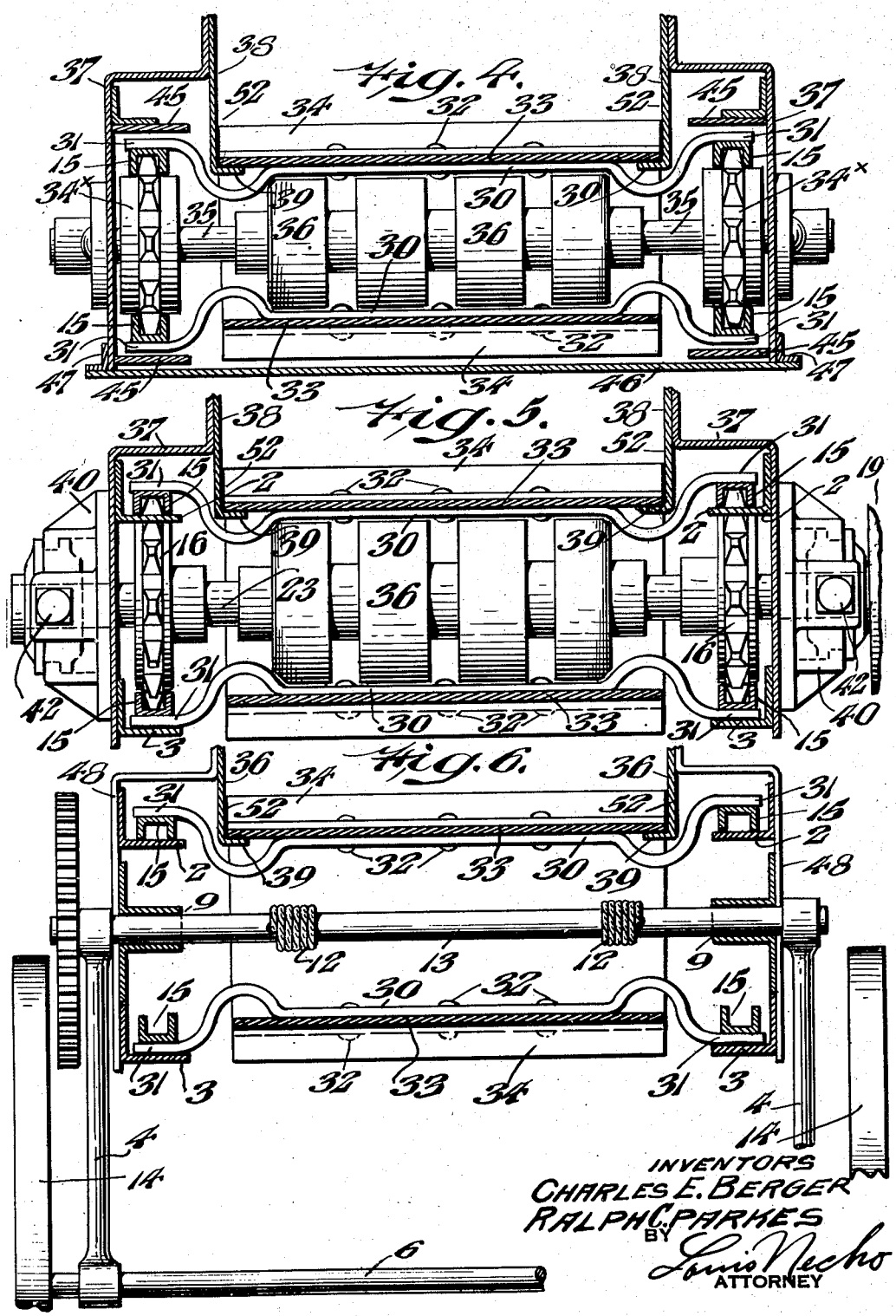

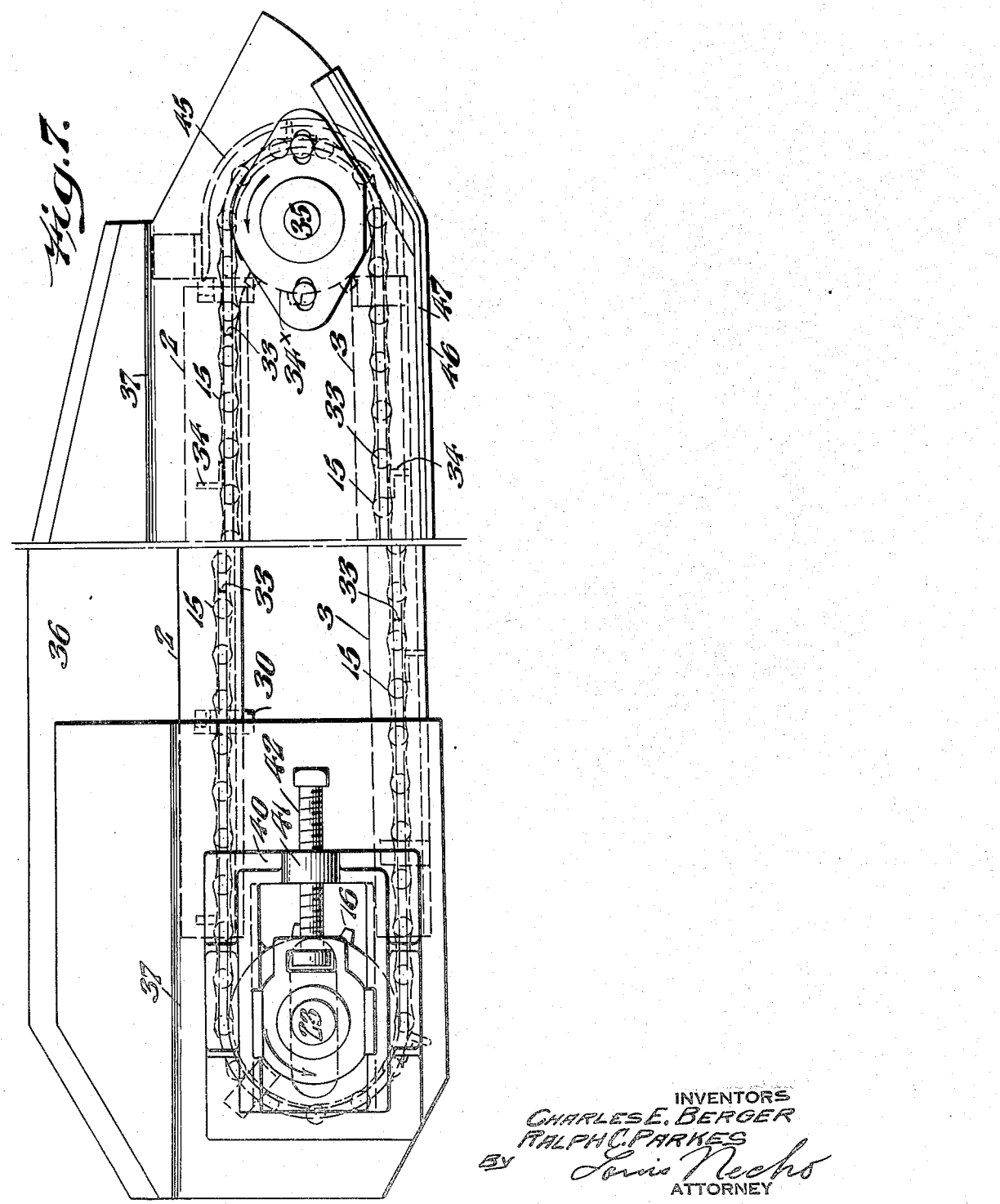

Patented Oct. 6, 1936

2,056,501

UNITED STATES PATENT OFFICE 2,056,501

LOADING MACHINE

Charles E. Berger, Norristown, and Ralph C. Parkes, Philadelphia, Pa.

Application October 26, 1934, Serial No. 750,154

2 Claims. (Cl. 198—194)

Our invention relates to a new and useful loading machine of the type employing an endless conveyor and generally utilized for the loading of coal, crushed stone, and similar heavy materials in bulk, from a pile on to a truck.

Loading machines of this general character comprise an elongated frame tiltably mounted on a suitable movable or self-propelling truck or other support, together with an endless conveyor carried by said frame. The endless conveyor is in the form of a belt which has heretofore been frictionally propelled by either front or rear, driving or driven rollers, or both, with or without intermediate idler pulleys for supporting the belt along its length.

Loading machines of this character are continuously exposed to weather conditions which may cause the belt to shrink or expand, and in order to attain the necessary friction between the belt and the driving rollers the belt must at all times be stretched taut on said rollers, and after a certain amount of wear the under surface of the belt as well as the driving surface of the rollers are worn smooth, thus resulting in slippage and inefficiency. Furthermore, the belt, due to the weight to which it is subjected, tends to bend or be deflected into nodulations intermediate the rollers supporting it, thus deforming the belt and increasing the wear and tear, as well as decreasing the efficiency.

A further disadvantage of the conventional constructions consisted in the necessity of the belt being bent around the necessarily relatively small diameter of the front and rear driving or driven rollers, so that the outer surface of the belt is stretched to a greater diameter than the inner surface thereof, thus causing the belt to crack and the plies of which it is made to separate. If the front and rear pulleys are made of a diameter sufficiently large to prevent the undue bending of the relatively thick and inflexible belt, it will add considerably to the size of the machine and will render the loading of the material on to the lower end of the machine more difficult, due to its increased elevation. The use of supporting idle rollers intermediate the ends of the belt greatly adds to the cost of construction and the weight of the completed machine and also results in undue loss of the propelling force.

A still further disadvantage of loading machines of this character is that, due to the lack of positive drive and the variation in the frictional contact constituting the driving force, the belt tended to run out of line and become warped, all of which further decreased the efficiency of operation.

It is, therefore, an object of our invention to obviate the foregoing and other disadvantages and to produce a loading machine of this character which is provided with means for effecting positive drive of the belt, and means for effectively supporting the belt and maintaining it in perfect alignment throughout its entire length.

A further object of our invention is to so protect the working parts of the mechanism from contact with the crushed stone, coal or other material being loaded on the belt.

A still further object of our invention is to eliminate entirely the necessity of driving or driven rollers over which the belt must travel and around which the belt must bend, thereby eliminating the undue distension of the outer surface of the belt and safeguarding against cracking thereof or separation of its plies.

A still further object of our invention is to produce a loading machine of this character which is of a simple, inexpensive and durable construction, and in which the life of the endless belt is very greatly prolonged.

To the above ends, our invention consists of a suitable elongated rigid frame carried by a suitable movable or self-propelling support, said frame being tiltable at any desired angle at will, a driving sprocket at one end of said frame, a driven sprocket at the other end of said frame, endless chains carried by said sprockets, and an endless belt carried by brackets spaced at suitable intervals and carried by said sprocket chains, said frame also constituting tracks for the chains to travel on intermediate said driving and driven sprockets.

Our invention still further consists of means for preventing the material being loaded on the belt from access to the sprocket wheels, sprocket chains and their tracks, thus protecting the working parts of the mechanism from the jamming or abrasive action of such materials.

Our invention still further consists of various other novel features of construction and advantage, all as hereinafter set forth in connection with the accompanying drawings in which:

Fig. 1 represents a side elevation of a loading machine embodying our invention.

Fig. 2 represents a plan view of Fig. 1.

Fig. 3 represents a section on line 3—3 of Fig. 2.

Fig. 4 represents a section, on an enlarged scale, on line 4—4 of Fig. 2.

Fig. 5 represents a section, on an enlarged scale, on line 5—5 of Fig. 2.

Fig. 6 represents a section, on an enlarged scale, on line 6—6 of Fig. 2.

Fig. 7 represents a side elevation, on an enlarged scale, of the front and rear operating ends of the loading machine.

Referring to the drawings in which like reference characters indicate like parts, our novel loading machine, as will be seen from Figs. 1, 2, and 3, is of an elongated construction and is built about a frame which preferably is composed of the angle irons 2 and 3 and is mounted on the pairs of supporting arms 4 and 5. The supporting arms 4 are of an entirely rigid construction, while the supporting arms 5 are pivoted to the shaft 6 and carry at their free ends the transverse shaft 8 which is movable in the slot 9 so that when the crank handle 10 is turned to wind the cord 12 over the rod 13 the shaft 8 will move in the slot 9 in the direction of the arrow in Fig. 1, thus elevating the entire loading machine from the position shown in full lines in Fig. 1 to the position shown in dotted lines or to whatever extent is desired within the range of movement provided. The shaft or axle 6 is supported by the wheels 14 by means of which the entire loading machine can be moved from one site to another, or, if desired, the entire loading machine can be carried by an automotive vehicle in any desired manner. The angle irons 2 and 3, in addition to constituting the frame of the machine, also serve as tracks over which travel the sprocket chains 15 which are driven by the sprocket wheels 16 at the discharge end of the machine, which in turn are driven by the belt 18 passing over the pulleys 19 and 20, the pulley 20 being actuated by the belt 21 from any conventional motor or source of power 22, it being understood that the pulley 19 is mounted on the shaft 23 which carries the sprocket wheels 16. 30 designates a series of brackets which are secured at their outer ends 31 to the sprocket chains 15. The brackets 30 are suitably spaced and are secured by means of bolts 32 to the belt 33, which is also provided at intervals with the flights 34 which serve to propel the coal or other material placed on the belt. At the feed end of the machine is a shaft 35 which carries the idle sprockets 34x for supporting the chains 15. In order to prevent any of the material being loaded on the belt from reaching the angle irons 2 (which form tracks for the sprocket chains 15), we provide angle irons 38 which are carried by housings 37 at the discharge and feed ends of the machine and which underlap the longitudinal edges of the belt 33, as shown at 39, the housings 37 being suitably secured to the angle irons 2 and 3 forming the frame of the machine. In order to provide for adjustment calculated to take up any play that may develop, due to a stretching of the belt, we provide the bracket 40 which has the threaded hub 41 which is engaged by the threaded bolt 42 which in turn engages the shaft 23 to move said shaft and the pulley 19 and sprockets 16 carried thereby towards or away from the center of the machine, thereby keeping the belt and sprocket chains properly adjusted at all times. An auxiliary guard 45 is carried by the housing 37 near the feed end of the machine and serves to prevent any of the material being loaded from reaching any of the moving parts at that end of the machine. At the bottom of the feed end housing 37 is the protecting and supporting base plate 46 which is secured to said housing 37 by the angle irons 47. 48 designates a series of reinforcing braces connecting the upper and lower angle irons or tracks 2 and 3. The shaft 23 and the shaft 35 carry idle rollers 36 which are normally spaced from the underside of the belt 33 but which serve as supports to take up any unexpected thrusts to which the belt may be subjected in actual operation.

The operation is as follows: The loading machine is brought to the pile of material to be loaded, with the feed end thereof adjacent the pile of material and the discharge end thereof overhanging the truck or other receptacle into which the material is to be loaded. The angle to which the loading machine is set is regulated by manipulating the crank handle 10 to raise and lower the discharge end of the loading machine, as above set forth. The material to be loaded is then shovelled on to the feed or lower end of the loading machine, and the belt 33 carrying the flights 34 is propelled by the motor or other source of power 22 to travel endlessly over the sprocket wheels 16, the belt 33 being supported at suitable intervals along the entire length thereof by the rigid brackets 30 extending completely across the width of the belt and attached at their outer ends to the sprocket chains 15. The material loaded on the belt is propelled forwardly by the flights 34 and is prevented from reaching the tracks on which the sprocket chains travel by the guards 38 which abut against and underlap the longitudinal edges of the belt.

It will thus be seen that by our novel construction the endless belt is provided with positive supports in the form of the brackets 30 which extend transversely of the belt at suitable intervals and which serve to keep the belt in constant alignment, since the brackets are carried by the sprocket chains 15 which propel the belt and which travel over the driving sprocket wheels 16 and the idle sprocket wheels 34x. By eliminating the frictional drive we not only increase the efficiency but also indefinitely prolong the life of the belt, since the belt is not compelled to bend around and frictionally engage the relatively small driving and driven rollers heretofore used, the rollers 36 in our construction being normally free of the belt and serving only to support the belt when the latter is subjected to thrust. It will also be seen that by means of the guards 38 and 45 we have adequately protected the working parts, such as the tracks where the chains 15 travel, as well as the sprocket wheels, from contact with the destructive and abrasive material that may be placed on the belt 33.

We claim:

1. A loading machine, comprising a frame including upper and lower angle members forming tracks, driving sprocket wheels at one end of said frame, idle sprocket wheels at the other end thereof, sprocket chains engaging said sprocket wheels and travelling over said tracks, an endless belt, brackets secured to said endless belt and attached at their outer ends to said sprocket chains, and vertical side members abutting against and underlapping the longitudinal edges of said belt.

2. A loading machine, comprising a frame including upper and lower angle members forming tracks, driving sprocket wheels at one end of said frame, idle sprocket wheels at the other end thereof, sprocket chains engaging said sprocket wheels and travelling over said tracks, an endless belt, brackets secured to said endless belt and attached at their outer ends to said sprocket chains, and idle rollers at each end of the machine below but normally out of contact with the under surface of said belt.

CHARLES E. BERGER.
RALPH C. PARKES.